United States Patent
Miyazaki et al.

(10) Patent No.: US 10,162,201 B2
(45) Date of Patent: Dec. 25, 2018

(54) OPTICAL MODULATOR

(71) Applicant: Sumitomo Osaka Cement Co., Ltd, Tokyo (JP)

(72) Inventors: Norikazu Miyazaki, Tokyo (JP); Toshio Kataoka, Tokyo (JP); Youichi Hosokawa, Tokyo (JP); Kei Katou, Tokyo (JP)

(73) Assignee: SUMITOMO OSAKA CEMENT CO., LTD., Chiyoda-Ku, Tokyo (JP)

(*) Notice: Subject to any disclaimer, the term of this patent is extended or adjusted under 35 U.S.C. 154(b) by 0 days.

(21) Appl. No.: 15/515,831

(22) PCT Filed: Dec. 24, 2015

(86) PCT No.: PCT/JP2015/085911
§ 371 (c)(1),
(2) Date: Mar. 30, 2017

(87) PCT Pub. No.: WO2016/104551
PCT Pub. Date: Jun. 30, 2016

(65) Prior Publication Data
US 2017/0307911 A1 Oct. 26, 2017

(30) Foreign Application Priority Data
Dec. 26, 2014 (JP) .................. 2014-264665

(51) Int. Cl.
*G02B 26/00* (2006.01)
*G02F 1/03* (2006.01)
(Continued)

(52) U.S. Cl.
CPC .............. *G02F 1/03* (2013.01); *G02B 26/02* (2013.01); *G02F 1/0121* (2013.01);
(Continued)

(58) Field of Classification Search
CPC .. G02F 1/0121; G02F 1/0316; G02F 1/01708; G02F 1/225
(Continued)

(56) References Cited

U.S. PATENT DOCUMENTS 7,133,578 B2 11/2006 Doi
7,263,244 B2 8/2007 Tanaka et al.
(Continued)

FOREIGN PATENT DOCUMENTS

JP H05324748 A 12/1993
JP 2005037547 A 2/2005
(Continued)

OTHER PUBLICATIONS

International Search Report of PCT/JP2015/085911 dated Mar. 29, 2016.

*Primary Examiner* — Mahidere Sahle
(74) *Attorney, Agent, or Firm* — Taft Stettinius & Hollister LLP (57) ABSTRACT

Provided is an optical modulator in which low-voltage drive and a stable modulation characteristic are secured over a wide bandwidth. An optical modulator includes: a substrate 10; an optical waveguide (not shown) formed in the substrate 10; a modulation electrode (a signal electrode 11 and a ground electrode 12) for modulating light waves propagating through the optical waveguide; and an external signal line (not shown, only a connection connector 4 is shown) which is provided outside the substrate and supplies a modulation signal to the modulation electrode, in which an impedance value of the modulation electrode in an active region S in which an electric field formed by the modulation electrode is applied to the optical waveguide is set to be lower than an impedance value of the external signal line, and an impedance adjustment part 21 having an impedance adjustment function with respect to mainly a modulation
(Continued)

signal in a low-frequency area and configured of a lumped-constant circuit, and an impedance matching line L having an impedance adjustment function with respect to mainly a modulation signal in a high-frequency area are disposed between the external signal line and the active region of the modulation electrode.

5 Claims, 6 Drawing Sheets

(51) Int. Cl.
    *G02F 1/035*     (2006.01)
    *G02B 26/02*     (2006.01)
    *G02F 1/01*     (2006.01)
    *G02F 1/025*     (2006.01)
    *G02F 1/313*     (2006.01)

(52) U.S. Cl.
    CPC ............ *G02F 1/0126* (2013.01); *G02F 1/025* (2013.01); *G02F 1/035* (2013.01); *G02F 1/3133* (2013.01); *G02F 2203/21* (2013.01)

(58) Field of Classification Search
    USPC .......................................................... 359/290
    See application file for complete search history.

(56) References Cited

U.S. PATENT DOCUMENTS

| | | | |
|---|---|---|---|
| 7,345,803 | B2 | 3/2008 | Nakajima et al. |
| 2005/0013522 | A1 | 1/2005 | Doi |
| 2005/0201653 | A1 | 9/2005 | Gilardi et al. |

FOREIGN PATENT DOCUMENTS

| | | |
|---|---|---|
| JP | 2005109950 A | 4/2005 |
| JP | 2007010942 A | 1/2007 |
| JP | 2007072369 A | 3/2007 |
| JP | 2012227793 A | 11/2012 |
| WO | WO2005091056 A1 | 9/2005 |
| WO | WO2012011309 A1 | 1/2012 |

FIG. 7

OPTICAL MODULATOR

TECHNICAL FIELD

The present invention relates to an optical modulator and in particular, to an optical modulator having a substrate, an optical waveguide formed in the substrate, a modulation electrode for modulating light waves propagating through the optical waveguide, and an external signal line which supplies a modulation signal to the modulation electrode.

BACKGROUND ART

In an optical communication field and an optical measurement field, an optical modulator, in particular, an optical modulator in which an optical waveguide and a modulation electrode which modulates light waves propagating through the optical waveguide are provided in a substrate is frequently used. In recent years, a polarization-combining type multi-level modulator enabling optical communication exceeding 100 Gbps has also been used. In such an optical modulator, a structure is made in which a plurality of optical modulator units each having a Mach-Zehnder type optical waveguide are integrated. For this reason, a configuration of a modulation part to drive at low voltage (apart in which an electric field formed by a modulation electrode acts on an optical waveguide, and also referred to as an "active region") is required.

In general, in order to realize a low drive voltage, it is known that the strength of an electric field which is applied to an optical waveguide is increased by narrowing the distance between a signal electrode and a ground electrode which configure a modulation part. On the other hand, in an optical modulator having a traveling electrode, in order to realize a broadband characteristic, it is necessary to match the velocity of the propagating light of an optical waveguide in a modulation part and the velocity of a modulation signal propagating through a modulation electrode. Usually, in order to match the velocity of the propagating light and the velocity of the modulation signal, it is necessary to increase an electrode thickness. In this manner, in a case of increasing the electrode height, the impedance of a RF line (a modulation electrode) of the modulation part becomes lower and becomes even lower than 50Ω which is general impedance of an external signal circuit.

In a case where the impedance of the modulation part is different from the impedance of a signal source or a modulator driver which is an external signal circuit of the optical modulator, reflection of an electric signal which is input to the optical modulator is generated due to impedance mismatch, thereby causing degradation of a signal or an increase of drive voltage. For this reason, a technique of forming an impedance matching line on a modulator device substrate, as shown in Patent Literature No. 1, or a technique of improving impedance matching by inserting a resistor in series into a line by using a relay board or the like, as in Patent Literature No. 2, is known.

In a case where the impedance of the modulation part is low, even in a case of improving a signal reflection characteristic S11 by forming the impedance matching line by using the technique disclosed in Patent Literature No. 1, in a low-frequency area in which a sufficient line length is not secured, and thus impedance matching is difficult, the S11 characteristic is generally determined by connector impedance on the signal input side set to impedance equal to that of an external signal circuit, and termination impedance of a termination circuit. For example, in a case where a connector is 50Ω and a termination circuit is 25Ω, the amount of reflection of −9.5 dB is obtained.

Further, in a case of improving impedance matching by inserting a relay board having a resistor series-connected to a signal line into the front section of a low-impedance line which is a modulation part, as in Patent Literature No. 2, electric power is consumed by the resistor, and thus a problem in which the amplitude of a signal which is input to the modulation part is reduced occurs. Further, if a frequency becomes higher, the influence of a line length of the modulation part compared to the signal wavelength becomes non-negligible, and synthetic impedance on the modulator side when viewed from a connector greatly deviates from the sum of matching resistance and termination resistance, and thus there is also a problem in which impedance matching cannot be taken.

CITATION LIST

Patent Literature

[Patent Literature No. 1] Japanese Laid-open Patent Publication No. 2005-37547
[Patent Literature No. 2] US Laid-open Patent Publication No. 2005/0201653A1

SUMMARY OF INVENTION

Technical Problem

An object of the present invention is to solve the problems as described above and provide an optical modulator in which low-voltage drive and a stable modulation characteristic are secured over a wide bandwidth.

Solution to Problem

In order to solve the above problems, an optical modulator according to the present invention has the following technical features.

(1) An optical modulator includes: a substrate; an optical waveguide formed in the substrate; a modulation electrode for modulating light waves propagating through the optical waveguide; and an external signal line which is provided outside the substrate and supplies a modulation signal to the modulation electrode, and an impedance value of the modulation electrode in an active region in which an electric field formed by the modulation electrode is applied to the optical waveguide is set to be lower than an impedance value of the external signal line, and an impedance adjustment part having an impedance adjustment function with respect to mainly a modulation signal in a low-frequency area and configured of a lumped-constant circuit, and an impedance matching line having an impedance adjustment function with respect to mainly a modulation signal in a high-frequency area are disposed between the external signal line and the active region of the modulation electrode.

(2) In the optical modulator according to the above (1), the impedance adjustment part has a configuration in which a resistor and a capacitor are connected in parallel.

(3) In the optical modulator according to the above (1) or (2), the impedance matching line is formed by adjusting the shapes of a signal electrode and a ground electrode which configure the modulation electrode, and a distance between the signal electrode and the ground electrode.

(4) In the optical modulator according to the above (3), the impedance matching line is either of a multi-section matching line having a plurality of different impedance values or a tapered matching line in which an impedance value changes continuously.

(5) In the optical modulator according to any one of the above (1) to (4), at least one of the impedance adjustment part and the impedance matching line is provided in a relay board provided outside the substrate.

(6) In the optical modulator according to any one of the above (1) to (5), a terminator is connected to an end of the modulation electrode, and impedance of the terminator is set to be the same as or be less than an impedance value of the modulation electrode in the active region.

Advantageous Effects of Invention

According to the present invention, it is possible to provide an optical modulator in which even in a case where an impedance value of a modulation electrode in an active region is set to be lower than an impedance value of an external signal line which supplies a modulation signal to the modulation electrode, an impedance adjustment part having an impedance adjustment function with respect to mainly a modulation signal in a low-frequency area and configured of a lumped-constant circuit, and an impedance matching line having an impedance adjustment function with respect to mainly a modulation signal in a high-frequency area are disposed between the external signal line and the active region of the modulation electrode, whereby the reflection characteristic of the modulation signal can be improved over a wide bandwidth and low-voltage drive and a stable modulation characteristic are achieved.

DESCRIPTION OF EMBODIMENTS

Hereinafter, an optical modulator according to the present invention will be described in detail by using a preferred embodiment.

Figure 1:
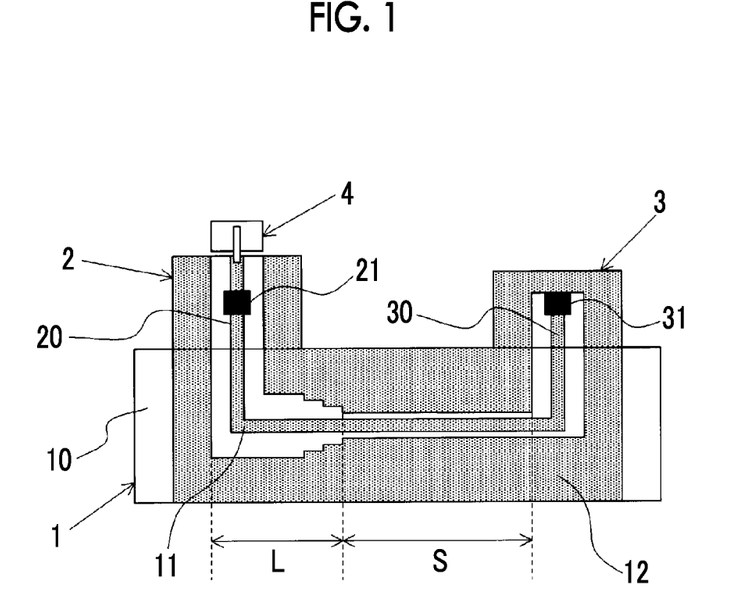
FIG. 1 is a diagram for describing the outline of an optical modulator according to the present invention.

As shown in FIG. 1, an optical modulator according to an aspect of the present invention includes: a substrate 10; an optical waveguide (not shown) formed in the substrate 10; a modulation electrode (a signal electrode 11 and a ground electrode 12) for modulating light waves propagating through the optical waveguide; and an external signal line (not shown, only a connection connector 4 is shown) which is provided outside the substrate and supplies a modulation signal to the modulation electrode, in which an impedance value of the modulation electrode in an active region S in which an electric field formed by the modulation electrode is applied to the optical waveguide is set to be lower than an impedance value of the external signal line, and an impedance adjustment part 21 having an impedance adjustment function with respect to mainly a modulation signal in a low-frequency area and configured of a lumped-constant circuit, and an impedance matching line L having an impedance adjustment function with respect to mainly a modulation signal in a high-frequency area are disposed between the external signal line and the active region of the modulation electrode.

As the substrate which is used in the optical modulator according to the present invention, a substrate having an electro-optic effect, such as a single crystal of any one of $LiNbO_3$, $LiTaO_5$, and PLZT (lead lanthanum zirconate titanate), a semiconductor such as InP, or a polymer, can be suitably used. In particular, $LiNbO_3$ and $LiTaO_5$ which are frequently used in a light control element such as an optical modulator are preferable.

The optical waveguide is formed in the substrate. The optical waveguide which is formed in the substrate is formed by thermally diffusing titanium (Ti) or the like onto, for example, a $LiNbO_3$ substrate (an LN substrate). Further, a ridge type optical waveguide in which concavity and convexity are formed along an optical waveguide in a substrate can also be used. As a pattern shape of the optical waveguide, various shapes such as a Mach-Zehnder type waveguide or a nested waveguide made by combining a plurality of Mach-Zehnder type waveguides can be adopted according to the use of the optical modulator.

The modulation electrode is composed of the signal electrode 11 and the ground electrode 12, as shown in FIG. 1, and can be formed by forming an electrode pattern of Ti.Au on the surface of a substrate by a gold plating method or the like. Further, as necessary, it is also possible to provide a buffer layer such as a dielectric $SiO_2$ on the substrate surface subjected to the optical waveguide formation and then form a modulation electrode on the upper side of the buffer layer. The signal electrode is not limited to a single signal electrode as shown in FIG. 1, and in a case where an optical waveguide has a plurality of modulation areas, a plurality of signal electrodes can be provided corresponding to the number of modulation areas.

The feature of the optical modulator according to an aspect of the present invention is that even in a case where the impedance of the active region (a modulation part) of the optical modulator is lower than the impedance of the external signal line, the reflection characteristic of the modulation signal is improved by the impedance adjustment part 21 and the impedance matching line L, and thus a decrease of drive voltage is realized over a wide bandwidth.

In the related art, as shown in Patent Literature No. 1, in a case where the impedance of an active region and the impedance of a signal line are different from each other, an impedance matching line is disposed between the active region and the signal line. However, in a low-frequency area of a modulation signal, the wavelength of an electric signal is long, and therefore, it is not possible to improve the reflection characteristic S11 characteristic of the modulation signal by impedance adjustment using the impedance matching line.

Therefore, the reflection characteristic (S11) is improved by a resistor provided in the impedance adjustment part. For example, in a case where input impedance is 50Ω and the S11 characteristic satisfies −15 dB or less which is a characteristic sufficient for a general digital communication, the sum of the resistance (matching resistance) of the adjustment part and termination resistance is set in a range of 35 to 65Ω.

However, a line length including the modulation part compared to the signal wavelength becomes non-negligible as a frequency increases, and therefore, it is not possible to improve S11 by only a resistor. Further, if a resistor is simply inserted in the front section o of the modulation part, the modulation signals of all frequency areas are consumed by the resistor, and thus the modulation signal which is substantively input to the modulation part is attenuated, and therefore, an increase of the drive voltage is caused.

For this reason, an increase of the drive voltage can be prevented by providing the impedance adjustment part with a lumped-constant circuit having an impedance adjustment function with respect to mainly a modulation signal in a low-frequency area, and suppressing the attenuation of a modulation signal in a high-frequency area. As an example of the lumped-constant circuit, a circuit in which a capacitor 212 is connected in parallel with a resistor 211, as shown in FIG. 2, can be used.

Figure 2:
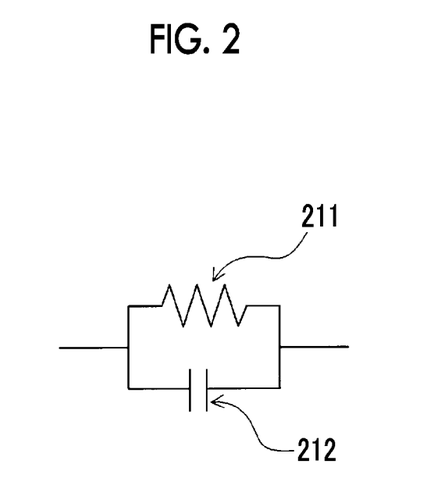
FIG. 2 is a diagram for describing an example of an electric circuit of an impedance adjustment part which is used in the optical modulator according to the present invention.
Figure 3:
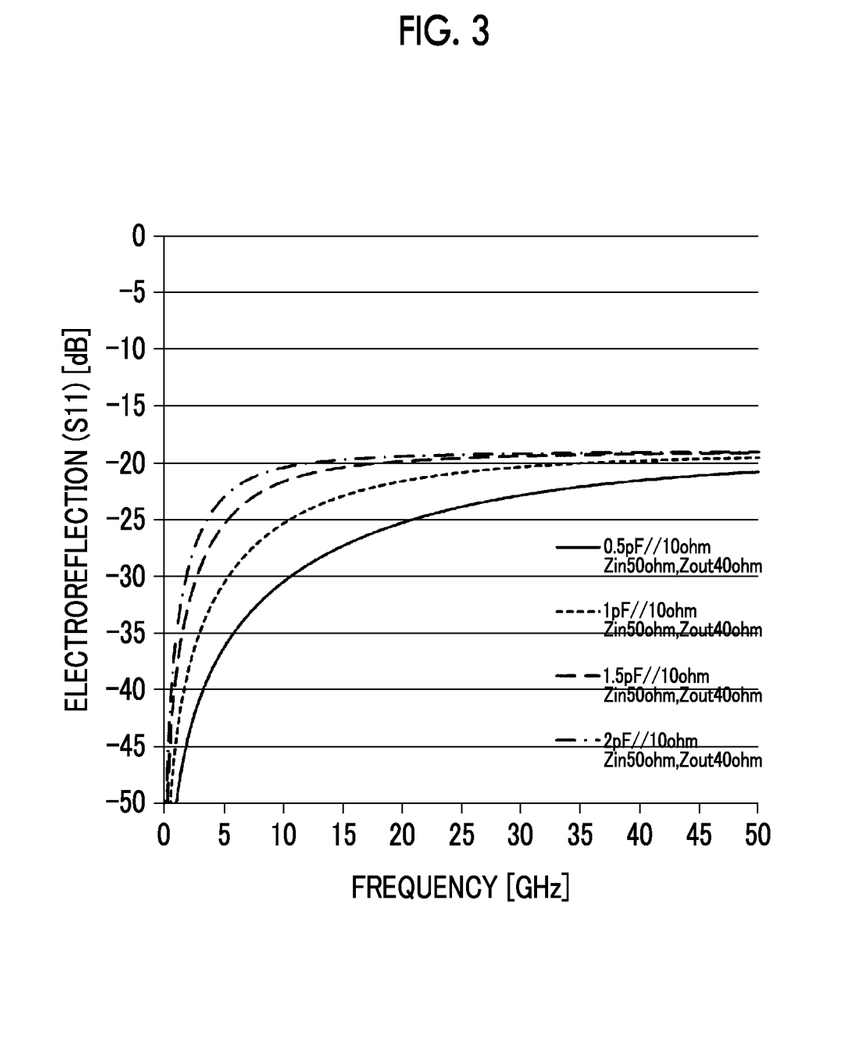
FIG. 3 is a graph (Part 1) showing the frequency dependence of an electroreflection characteristic in a case where the impedance adjustment part is provided.

FIG. 3 shows the frequency dependence of an electrical reflection characteristic (S11) when the resistor 211 shown in FIG. 2, which is an impedance adjustment part, is set to 10Ω and the capacity of the capacitor 212 is changed to 0.5 pF, 1 pF, 1.5 pF, and 2 pF, in a case where input impedance is set to be 50Ω and the impedance of the modulation part (the active region) is set to be 40Ω.

Figure 4:
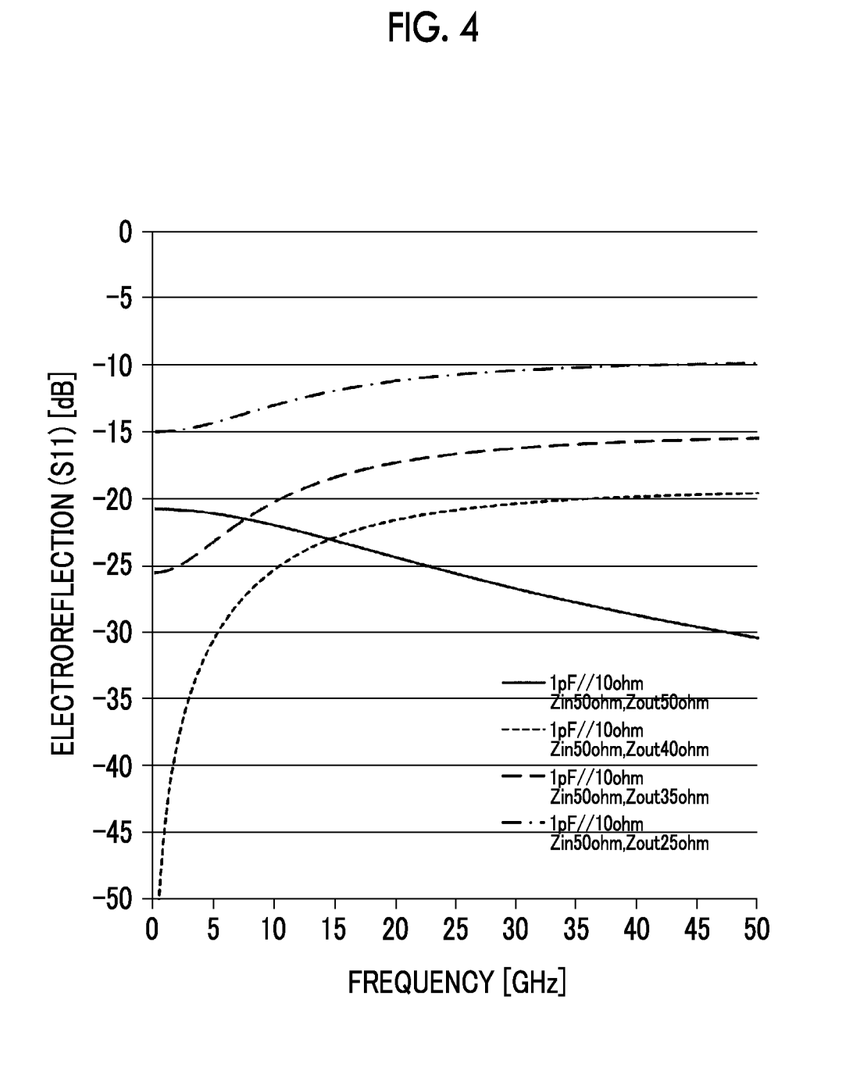
FIG. 4 is a graph (Part 2) showing the frequency dependence of an electrical reflection characteristic in a case where the impedance adjustment part is provided.

Further, FIG. 4 shows the frequency dependence of an electrical reflection characteristic (S11) when input impedance is 50Ω and the impedance of the modulation part is changed to 50, 40, 35, and 25Ω, in a case where the resistor 211 of the impedance adjustment part is set to 10Ω and the capacity of the capacitor 212 is set to 1 pF.

According to FIG. 3, it is easily understood that the reflection characteristic is effectively suppressed in a low-frequency area. However, although it depends on the capacity of the capacitor, due to the connection of the capacitor, in a high-frequency region, degradation of the S11 characteristic is generated by a difference between the impedance of the RF input and the impedance of the modulation part. Further, according to FIG. 4, it is easily understood that the S11 characteristic cannot be sufficiently improved as a difference between the input impedance and the impedance of the modulation part becomes larger.

In order to prevent degradation of such a characteristic, in the optical modulator according to an aspect of the present invention, the impedance matching line configured with a line is further provided between the lumped-constant type impedance adjustment part and the modulation part.

The impedance matching line is set to the impedance between the modulation part and line impedance after the impedance adjustment part, preferably, the value of geometric means of the modulation part and the line impedance. Further, the matching line may be made as a structure for improving the S11 characteristic over a wide bandwidth, for example, a multi-section matching line structure. Further, tapered impedance conversion in which the width of a signal electrode or the distance between a signal electrode and a ground electrode continuously changes such that impedance continuously changes may be used in the entirety or a part of the matching line.

Figure 5:
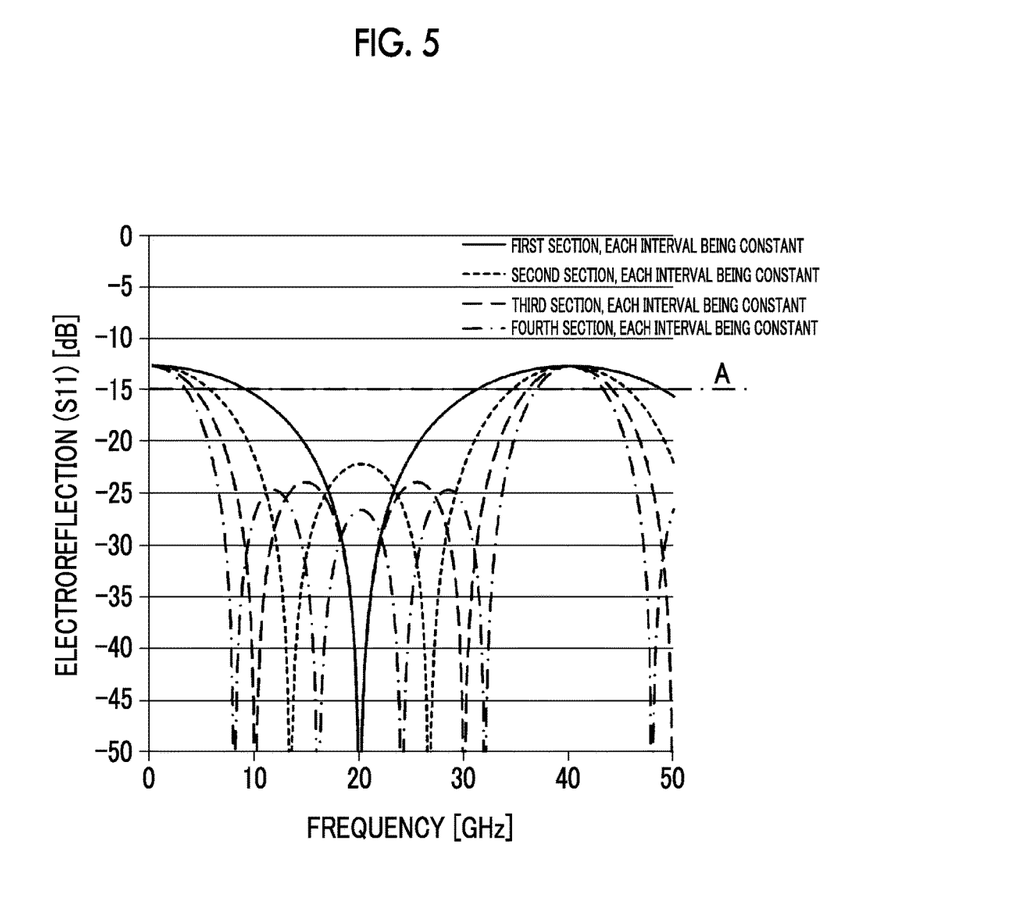
FIG. 5 is a graph (Part 1) showing the frequency dependence of an electrical reflection characteristic in a case where an impedance matching line is provided.
Figure 6:
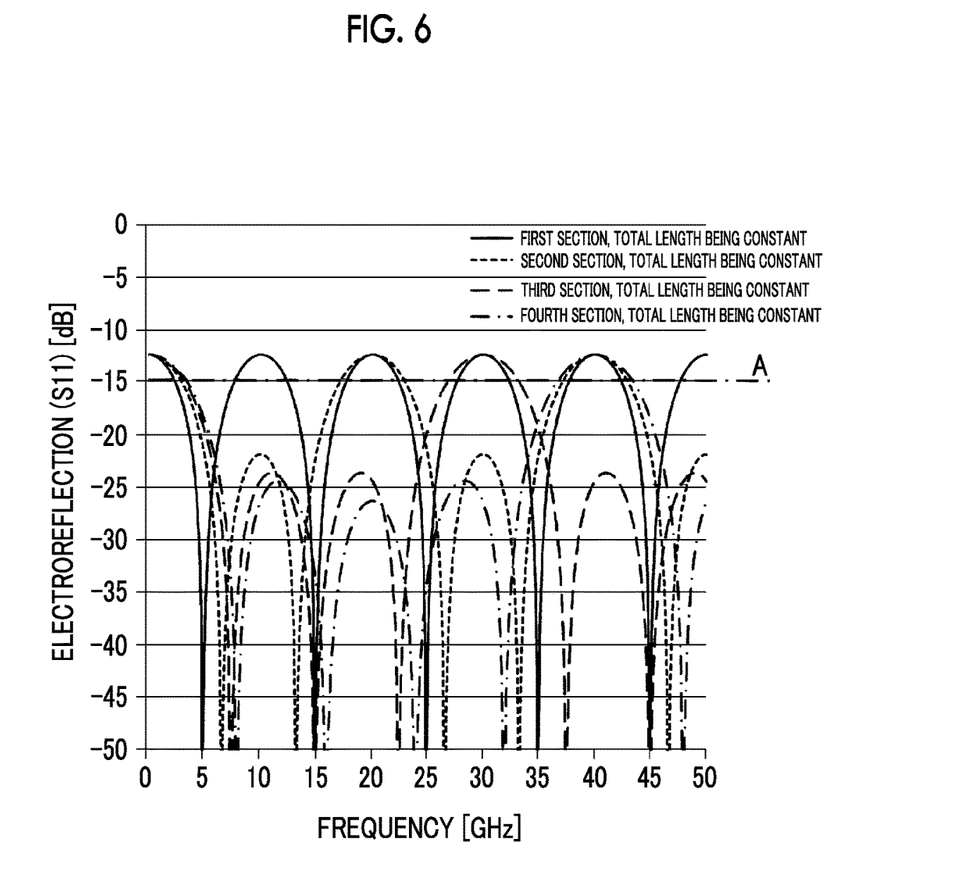
FIG. 6 is a graph (Part 2) showing the frequency dependence of an electrical reflection characteristic in a case where the impedance matching line is provided.

In FIGS. 5 and 6, the effects due to configuring the impedance matching line in a multi-section are confirmed. FIGS. 5 and 6 show the frequency dependence of a reflection characteristic when the impedance matching line is configured to change the number of the section(s) from 1 to 4, in a case where the impedance on the input side of the impedance matching line is set to be 40Ω and the impedance on the output side is set to be 25Ω.

However, FIG. 5 shows a case where in each interval configuring each section, a length is set to be constant, and FIG. 6 shows a case where the total length of all the intervals combining all the sections is set to be constant. According to FIG. 5 or 6, it is easily understood that the reflection characteristic in a high-frequency area can be further improved by increasing the number of sections, while with respect to a low-frequency area, the improvement is difficult. Further, in FIGS. 5 to 7, a characteristic level (−15 dB) which is required in a general digital communication is shown by a dot-and-dash line A.

Figure 7:
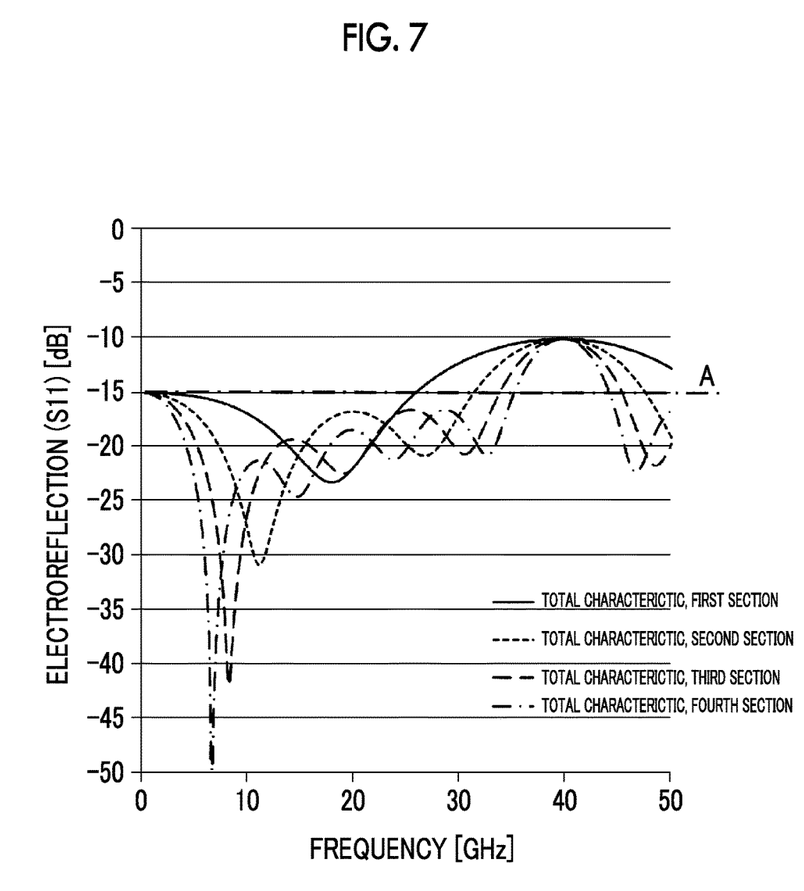
FIG. 7 is a graph showing the frequency dependence of an electrical reflection characteristic in a case where the impedance adjustment part and the impedance matching line are provided.

FIG. 7 shows the situation in a case where in the impedance adjustment part, the resistance is set to 10Ω and the capacity of the capacitor is set to 1 pF, and the impedance adjustment part is combined with the impedance matching line shown in FIG. 5. According to this, the reflection characteristic is improved over a wide range of a high-frequency area while realizing −15 dB or less also in a low-frequency area.

An example of the optical modulator according to the present invention is shown in FIG. 1. Reference numeral 4 denotes a connector for RF input. As a signal input part which inputs a signal to the optical modulator, in order to prevent degradation of a high-frequency characteristic, a RF connector or a flexible printed circuit (FPC), and a high-frequency substrate such as a CPW type feedthrough are used.

In the example of FIG. 1, a relay board 2 is provided. For the relay board, a substrate having a small loss at high-frequency, such as alumina ceramic, is used. A coplanar (CPW) type or microstrip (MS) type high-frequency line 20 is formed on the substrate. The impedance adjustment part 21 composed of a resistor part, a high-frequency capacitor, and the like is provided in the line 20 in order to adjust characteristics such as a reflection characteristic (S11) and a transmission characteristic (S21). The impedance adjustment part has a lumped-constant type circuit configuration, and as the simplest circuit configuration, a parallel circuit composed of a resistor and a capacitor, shown in FIG. 2, can be adopted.

The respective electric lines of the relay board 2 and an optical modulation device 1 are bonded to each other by an electrically-conductive wire or ribbon such as gold. A pad part is formed at a bonding location of a signal line.

The impedance adjustment part 21, the impedance matching line L, and a termination circuit (a termination resistor or the like) 31 may be formed on the same substrate, and each or some of them may be configured in separate substrates. For example, in FIG. 1, the impedance adjustment part 21 is provided on the relay board 2. However, it is also possible to incorporate the impedance matching line L on the relay board. Further, it is also possible to provide the impedance adjustment part 21 in the optical modulation device 1.

A modulation part (the active region) S which is a region for applying an electric field to the optical waveguide is present in the optical modulation device 1. In particular, in order to make the optical modulator have a wider bandwidth and a lower drive voltage, it is necessary to make the impedance of the active region lower impedance. For example, a coplanar structure having characteristic impedance of 40Ω or less is used.

The impedance matching line L is provided at the front section of the modulation part S. In principle, the impedance matching line may be disposed at either of the front section or the subsequent section of the impedance adjustment part 21.

The impedance matching line is formed by adjusting the shapes of the signal electrode 11 and the ground electrode 12 which configure the modulation electrode, and the distance between the signal electrode 11 and the ground electrode 12. Specifically, as shown in FIG. 1, the impedance matching line can be configured with a multi-section matching line L having a plurality of different impedance values. Further, the impedance matching line may be a tapered matching line in which an impedance value changes continuously.

The modulation signal which has passed through the modulation part is led out to the termination circuit 31. As shown in FIG. 1, a termination board 3 is disposed adjacent to the optical modulation device 1 and the respective signal lines are electrically connected. A signal which has passed through the modulation part S having low impedance propagates from the signal electrode 11 of the optical modulation device 1 to a signal line 30 of the termination board 3 and is terminated by the termination circuit (the termination resistor or the like) on the termination board 3.

The resistance or the like of the termination board is set to be substantially the same as or be less than the impedance of the modulation part. In particular, in a case where the characteristic impedance of the external signal circuit or a RF input part such as a connector is 50Ω, improvement of the reflection characteristic can be further expected, for example, in a case where the resistance of the termination board is set to be in a range of 25 to 30Ω.

INDUSTRIAL APPLICABILITY

As described above, according to the present invention, it is possible to provide an optical modulator in which low-voltage drive and a stable modulation characteristic are secured over a wide bandwidth.

REFERENCE SIGNS LIST

1: chip (optical modulation device)
2: relay board
3: termination board
4: RF input connector
11: signal electrode
12: ground electrode
21: impedance adjustment part
31: termination circuit
L: impedance matching line
S: modulation part (active region)

The invention claimed is:

1. An optical modulator comprising:
a substrate;
an optical waveguide formed in the substrate;
a modulation electrode for modulating light waves propagating through the optical waveguide; and an external signal line which is provided outside the substrate and supplies a modulation signal to the modulation electrode,
wherein an impedance value of the modulation electrode in an active region in which an electric field formed by the modulation electrode is applied to the optical waveguide is set to be lower than an impedance value of the external signal line,
an impedance adjustment part having an impedance adjustment function with respect to mainly a modulation signal in a low-frequency area and configured of a lumped-constant circuit, and an impedance matching line having an impedance adjustment function with respect to mainly a modulation signal in a high-frequency area are disposed between the external signal line and the active region of the modulation electrode,
a terminator is connected to an end of the modulation electrode, and
impedance of the terminator is set to be the same as or be less than an impedance value of the modulation electrode in the active region.

2. The optical modulator according to claim 1, wherein the impedance adjustment part has a configuration in which a resistor and a capacitor are connected in parallel.

3. The optical modulator according to claim 1, wherein the impedance matching line is formed by adjusting the shapes of a signal electrode and a ground electrode which configure the modulation electrode, and a distance between the signal electrode and the ground electrode.

4. The optical modulator according to claim 3, wherein the impedance matching line is either of a multi-section matching line having a plurality of different impedance values or a tapered matching line in which an impedance value changes continuously.

5. The optical modulator according to claim 1, wherein at least one of the impedance adjustment part and the impedance matching line is provided in a relay board provided outside the substrate.

* * * * *

UNITED STATES PATENT AND TRADEMARK OFFICE
CERTIFICATE OF CORRECTION

PATENT NO. : 10,162,201 B2
APPLICATION NO. : 15/515831
DATED : December 25, 2018
INVENTOR(S) : Norikazu Miyazaki et al.

It is certified that error appears in the above-identified patent and that said Letters Patent is hereby corrected as shown below:

In the Specification

Column 1, Line 25, delete "apart" and insert --a part--.

Signed and Sealed this
Twenty-first Day of May, 2019

Andrei Iancu
*Director of the United States Patent and Trademark Office*